United States Patent
Naamneh et al.

(10) Patent No.: US 11,204,992 B1
(45) Date of Patent: Dec. 21, 2021

(54) SYSTEMS AND METHODS FOR SAFELY EXECUTING UNRELIABLE MALWARE

(71) Applicant: CA, INC., San Jose, CA (US)

(72) Inventors: Bahaa Naamneh, Oslo (NO); Felix Leder, Taarnaasen (NO)

(73) Assignee: CA, INC., San Jose, CA (US)

( * ) Notice: Subject to any disclaimer, the term of this patent is extended or adjusted under 35 U.S.C. 154(b) by 189 days.

(21) Appl. No.: 16/560,273

(22) Filed: Sep. 4, 2019

(51) Int. Cl.
  *G06F 21/53* (2013.01)
  *G06F 9/54* (2006.01)
  *G06F 21/54* (2013.01)
  *G06F 21/56* (2013.01)

(52) U.S. Cl.
  CPC .............. *G06F 21/53* (2013.01); *G06F 9/541* (2013.01); *G06F 9/542* (2013.01); *G06F 21/54* (2013.01); *G06F 21/563* (2013.01); *G06F 21/564* (2013.01); *G06F 21/566* (2013.01)

(58) Field of Classification Search
  CPC .......... G06F 21/53; G06F 9/542; G06F 21/54; G06F 21/566; G06F 21/564; G06F 21/563; G06F 9/541
  See application file for complete search history.

(56) References Cited

U.S. PATENT DOCUMENTS

| | | | | |
|---|---|---|---|---|
| 7,921,299 B1 * | 4/2011 | Anantha | ............ | H04N 21/2543 713/187 |
| 8,887,152 B1 * | 11/2014 | Chen | .................. | G06F 9/44568 717/174 |
| 10,664,331 B2 * | 5/2020 | Green | ........................ | G06F 9/54 |
| 2017/0102976 A1 * | 4/2017 | Nandakumar | ............ | G06F 8/61 |
| 2017/0185774 A1 * | 6/2017 | Sahita | ................... | G06F 21/577 |

OTHER PUBLICATIONS

"Detecting Incompatible API Changes"—Carmen Andoh, GopherCon 2019, Jul. 26, 2019 https://about.sourcegraph.com/go/gophercon-2019-detecting-incompatible-api-changes/ (Year: 2019).*

"Analyzing Malware by API Calls"—Peter Amtz, Malware Bytes Labs, Oct. 31, 2017 https://blog.malwarebytes.com/threat-analysis/2017/10/analyzing-malware-by-api-calls/ (Year: 2017).*

* cited by examiner

*Primary Examiner* — Randy A Scott (74) *Attorney, Agent, or Firm* — Foley & Lardner LLP (57) ABSTRACT

The disclosed computer-implemented method for safely executing unreliable malware may include (i) intercepting a call to an application programming interface (API) in a computing operating system, the API being utilized by malware for disseminating malicious code, (ii) determining an incompatibility between the API call and the computing operating system that prevents successful execution of the API call, (iii) creating a proxy container for receiving the API call, (iv) modifying, utilizing the proxy container, the API call to be compatible with the computing operating system, (v) sending the modified API call from the proxy container to the computing operating system for retrieving the API utilized by the malware, and (vi) performing a security action during a threat analysis of the malware by executing the API to disseminate the malicious code in a sandboxed environment. Various other methods, systems, and computer-readable media are also disclosed.

20 Claims, 7 Drawing Sheets

SYSTEMS AND METHODS FOR SAFELY EXECUTING UNRELIABLE MALWARE

BACKGROUND

Malware authors may utilize various techniques to infect computing systems. For example, malware authors may write malicious code that utilizes application programming interface (API) calls to a computing operating system for performing file infection, code injection, and persistence techniques which are harmful to enterprise and consumer computing devices.

Conventional security products associated with malware analysis often rely on the successful execution of malicious code in a testing environment for observing malware behavior. However, the malicious code utilized by many malware authors may often be of poor quality (e.g., unreliable) due to non-compliance with a target computing operating system's API documentation (e.g., non-compliant system calls from a user-mode to the operating system's kernel code) or due to copying from various third-party sources such that the malicious code fails to successfully detonate on multiple versions of the target computing operating system. Consequently, the effectiveness of malware analysis systems configured to execute as much malicious code as possible in a testing (e.g., sandboxed) environment while observing its behavior may often be compromised due to the unreliability associated with certain malware.

SUMMARY

As will be described in greater detail below, the present disclosure describes various systems and methods for safely executing unreliable malware.

In one example, a method for safely executing unreliable malware may include (i) intercepting a call to an application programming interface (API) in a computing operating system, the API being utilized by malware for disseminating malicious code, (ii) determining an incompatibility between the API call and the computing operating system that prevents successful execution of the API call, (iii) creating a proxy container for receiving the API call, (iv) modifying, utilizing the proxy container, the API call to be compatible with the computing operating system, (v) sending the modified API call from the proxy container to the computing operating system for retrieving the API utilized by the malware, and (vi) performing a security action during a threat analysis of the malware by executing the API to disseminate the malicious code in a sandboxed environment.

In some embodiments, the API call may be intercepted by receiving the API call in a compatibility layer for the computing operating system. In some examples, the incompatibility between the API call and the computing operating system that prevents successful execution of the API call may be determined by determining that the API call is incompatible with a version of the computing operating system with stricter access rights than a different version of the computing operating system. For example, the API call may only be compatible with the different version (e.g., a 32-bit version and not a 64-bit version) of the computing operating system. Additionally or alternatively, the incompatibility between the API call and the computing operating system that prevents successful execution of the API call may be determined by (i) sending the API call in an access request to the computing operating system and (ii) receiving a denial of the access request based on the API call missing one or more access rights associated with the computing operating system.

In some embodiments, the proxy container to receive the API call may be created by (i) accessing a compatibility layer introduced to a kernel for the computing operating system to receive the API call and (ii) creating the proxy container within the compatibility layer. In some examples, the API call may be modified to be compatible with the computing operating system by adjusting one or more access rights associated with receiving the API call in the computing operating system. Additionally or alternatively, the API call may be modified to be compatible with the computing operating system by adjusting one or more parameters associated with receiving the API call in the computing operating system. For example, a parameter may be adjusted that is associated with calling an API to create a remote thread for performing a code injection operation.

In some examples, the threat analysis may be associated with protecting the one or more computing devices against infection by the malware outside of the sandboxed environment.

In one embodiment, a system for safely executing unreliable malware may include at least one physical processor and physical memory that includes a set of modules and computer-executable instructions that, when executed by the physical processor, cause the physical processor to (i) intercept, by an intercept module, a call to an application programming interface (API) in a computing operating system, the API being utilized by malware for disseminating malicious code, (ii) determine, by a determining module, an incompatibility between the API call and the computing operating system that prevents successful execution of the API call, (iii) create, by a container module, a proxy container for receiving the API call, (iv) modify, by a proxy module and utilizing the proxy container, the API call to be compatible with the computing operating system, (v) send, by a sending module, the modified API call from the proxy container to the computing operating system for retrieving the API utilized by the malware, and (vi) perform, by a security module, a security action during a threat analysis of the malware by executing the API to disseminate the malicious code in a sandboxed environment.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) intercept a call to an application programming interface (API) in a computing operating system, the API being utilized by malware for disseminating malicious code, (ii) determine an incompatibility between the API call and the computing operating system that prevents successful execution of the API call, (iii) create a proxy container for receiving the API call, (iv) modify, utilizing the proxy container, the API call to be compatible with the computing operating system, (v) send the modified API call from the proxy container to the computing operating system for retrieving the API utilized by the malware, and (vi) perform a security action during a threat analysis of the malware by executing the API to disseminate the malicious code in a sandboxed environment.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for safely executing unreliable malware. As will be described in greater detail below, the systems and methods described herein may improve malware analysis testing by increasing the access rights of malware such that malicious code may be successfully executed over multiple computing operating system versions in a testing environment. By increasing the access rights of malware in this way, the systems and methods described herein may improve the robustness of malware analysis systems by observing the behavior of poorly written malicious code that would otherwise be missed utilizing conventional means.

In addition, the systems and methods described herein may improve the security of computing devices by analyzing the behavior of malicious code executed over multiple operating systems for potential threats in a sandboxed environment, thereby protecting the computing devices against infection by malware when the malicious code is executed outside of the sandboxed environment.

Figure 1:
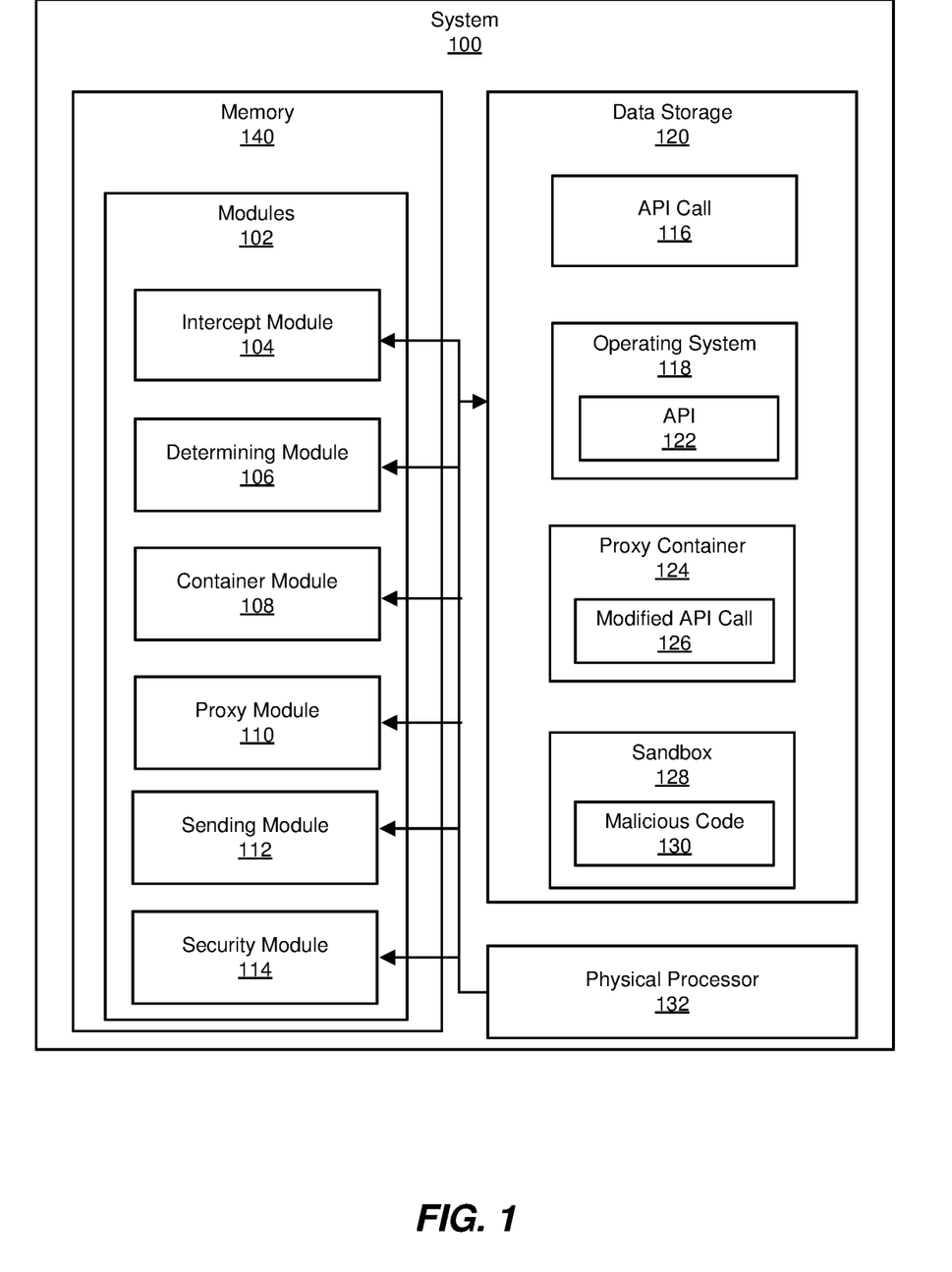
FIG. 1 is a block diagram of an example system for safely executing unreliable malware.
Figure 2:
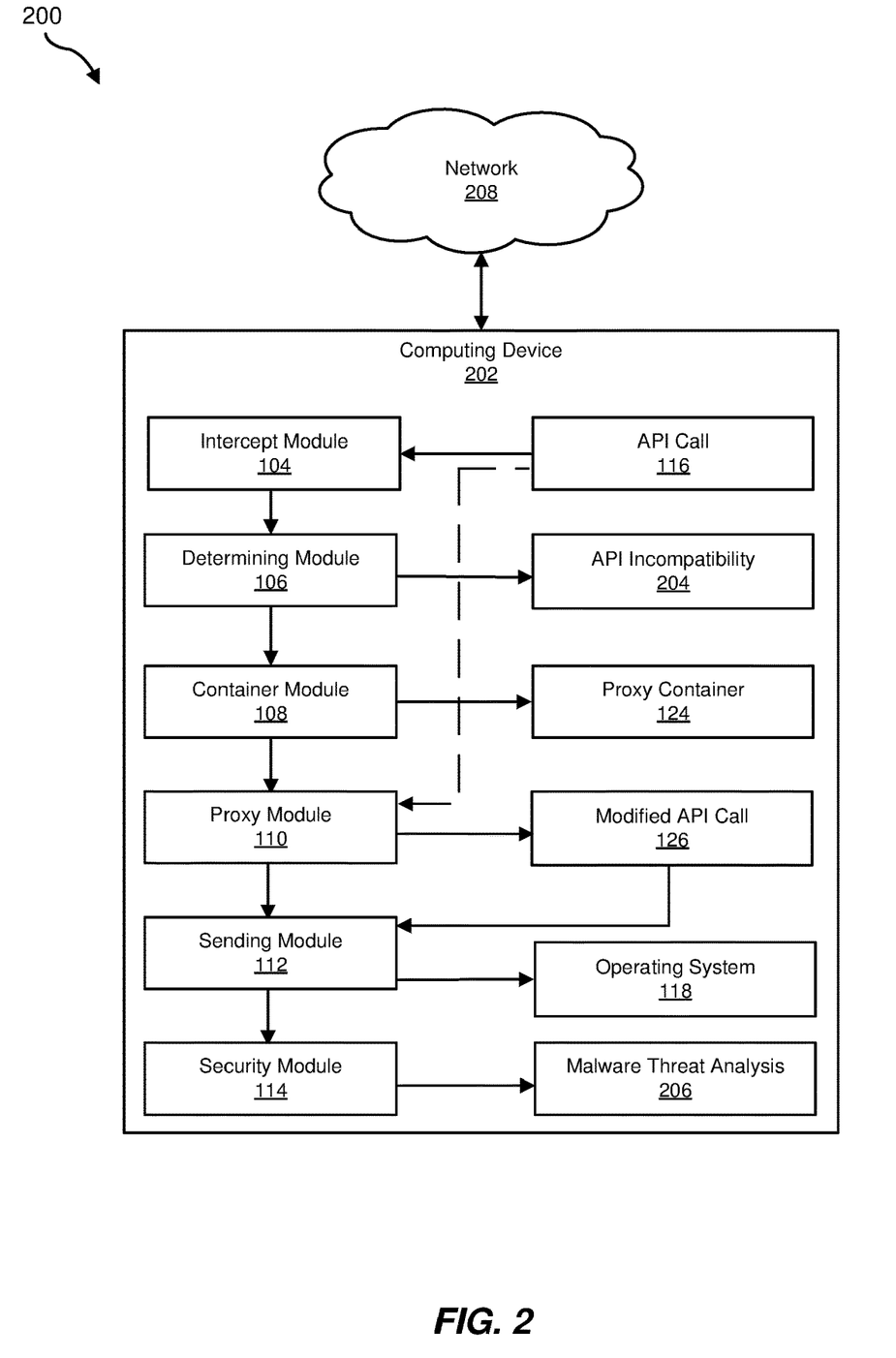
FIG. 2 is a block diagram of an additional example system for safely executing unreliable malware.

The following will provide, with reference to FIGS. 1-2, detailed descriptions of example systems for safely executing unreliable malware. Detailed descriptions of corresponding computer-implemented methods will also be provided in connection with FIG. 3. Detailed descriptions of example systems for providing a proxy container to handle incompatible API operating system calls initiated by an unreliable malware process will also be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for safely executing unreliable malware. As illustrated in this figure, example system 100 may include one or more modules 102 for performing one or more tasks. For example, and as will be explained in greater detail below, example system 100 may include an intercept module 104 that intercepts a call to an application programming interface (API), such as API call 116, in an operating system 118. Example system 100 may additionally include a determining module that determines an incompatibility between API call 116 and operating system 118 preventing successful execution of API call 116. Example system 100 may also include a container module 108 that creates a proxy container 124 for receiving API call 116. Example system 100 may additionally include a proxy module 110 that modifies API call 116 to be compatible with operating system 118. Example system 100 may also include a sending module 112 that sends modified API call 126 from proxy container 124 to operating system 118 for retrieving an API 122 utilized by malware. Example system 100 may additionally include a security module 114 that performs a security action during a threat analysis of the malware by executing API 122 to disseminate malicious code 130 in a sandbox 128. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the device illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 132. Physical processor 132 generally represents any type or form of hardware-implemented processing unit capable of interpreting and/or executing computer-readable instructions. In one example, physical processor 132 may access and/or modify one or more of modules 102 stored in memory 140. Additionally or alternatively, physical processor 132 may execute one or more of modules 102 to facilitate safely executing unreliable malware. Examples of physical processor 132 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store API call 116 (which may alternatively exist in memory 140 (e.g., as part of malware)), operating system 118, API 122, proxy container 124, modified API call 126, sandbox 128, and malicious code 130.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to safely execute unreliable malware.

For example, and as will be described in greater detail below, intercept module 104 may receive API call 116 for an API that may be utilized by malware for disseminating malicious code 130 on a computing system. Next, determining module 106 may determine an API incompatibility 204 between API call 116 and operating system 118 that prevents successful execution of API call 116. Then, container module 108 may create proxy container 124 for receiving API call 116 in response to API incompatibility 204. Next, proxy module 110 may modify, utilizing proxy container 124, API call 116 to be compatible with operating system 118. Then, sending module 112 may send modified API call 126 to operating system 118 for retrieving the API utilized by the malware. Finally, security module 114 may perform a security action during a malware threat analysis 206 of the malware by executing the API to disseminate the malicious code in a sandbox.

Computing device 202 generally represents any type or form of computing device capable of reading computer-executable instructions. In some embodiments, computing device 202 may be a malware analysis system (MAS) server configured to examine the behavior of executed malicious code in association with performing a threat analysis of the malware on a computing system. Additional examples of computing device 202 include, without limitation, laptops, tablets, desktops, other servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 208 generally represents any medium or architecture capable of facilitating communication or data transfer. In one example, network 208 may facilitate communication between computing device 202 and one or more other computing devices (not shown). In this example, network 208 may facilitate communication or data transfer using wireless and/or wired connections. Examples of network 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
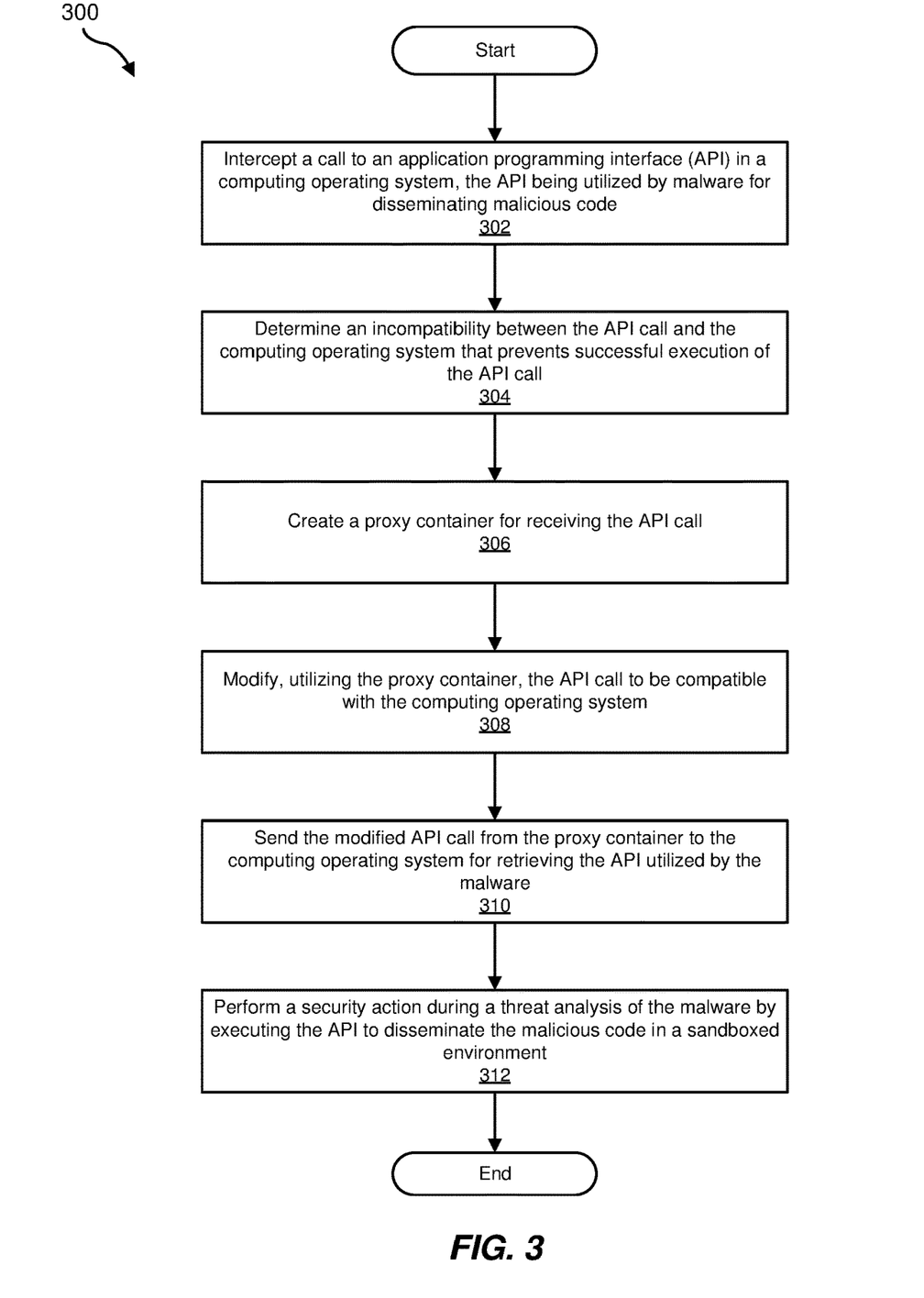
FIG. 3 is a flow diagram of an example method for safely executing unreliable malware.

FIG. 3 is a flow diagram of an example computer-implemented method 300 for safely executing unreliable malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may one or more of the systems described herein may intercept a call to an API in a computing operating system, where the API is utilized by malware for disseminating malicious code. For example, intercept module 104 may, as part of computing device 202 in FIG. 2, intercept API call 116 to operating system 118. In some examples, API call 116 may include, without limitation, a call to create a remote thread, call to retrieve a file object, a call to run a registry key, a call to obtain a handle and/or a call to open a file.

The term "unreliable malware," as used herein, generally refers to malicious code that may utilize various techniques intended to execute on (and subsequently compromise) a wide variety of computing systems, but which may fail to accomplish its intended task due to one or more factors. For example, unreliable malware may contain malicious code that relies on the correct use of an operating system's APIs (e.g., a WINDOWS operating system) but which may be non-compliant with API documentation for the operating system and/or which hasn't been tested on multiple versions or configurations of the operating system, resulting in the malware failing to successfully execute on one or more operating system versions.

Intercept module 104 may intercept API call 116 in a variety of ways. In some embodiments, intercept module 104 may receive API call 116 in a compatibility layer that may be introduced through a modification of operating system 118. For example, operating system 118 may be modified to introduce a compatibility layer to verify that API call 116 adheres to various parameters/flags and or access rights in corresponding API documentation for operating system 118 before an API is executed. If any discrepancies are found, API access requests made by the API call 116 may be denied by operating system 118. Additional details regarding the function of the compatibility layer in operating system 118 will be provided in the description of FIGS. 4-5, below.

At step 304, one or more of the systems described herein may determine an incompatibility between the API call intercepted at step 302 and the computing operating system that prevents successful execution of the API call. For example, determining module 106 may, as part of computing device 202 in FIG. 2, determine API incompatibility 204 between API call 116 and operating system 118.

Determining module 106 may determine API incompatibility 204 in a variety of ways. In some examples, determining module 106 may send or forward API call 116 in an access request to operating system 118 and receive a denial of the access request based on API call 116. In some examples, the denial of the access request may be based on API call 116 being deficient in one or more access rights associated with operating system 118. In some embodiments, certain versions of operating system 118 may have stricter access rights than other versions of operating system 118. For example, API call 116 may contain a handle to a process for creating a thread that includes a limited subset of access rights compatible with a version of operating system 118 (e.g., a 32-bit version) but that is incompatible with a different version of operating system 118 (e.g., a 64-bit version) requiring a full set of the access rights. In this example, the 32-bit and 64-bit versions may be equivalent versions of the same operating system targeting different CPU architectures.

At step 306, one or more of the systems described herein may create a proxy container for receiving the API call determined to be incompatible at step 304. For example, container module 108 may, as part of computing device 202 in FIG. 2, create proxy container 124 for receiving API call 116. In some embodiments, proxy container 124 may be created at an earlier stage of the computer-implemented method 300 (e.g., prior to step 302). For example, proxy container 114 may be created as a static container that performs modifications for all incoming API calls.

The term "proxy container," as used herein, generally refers to application code added to a computing operating system kernel and configured to function as an access agent for receiving and modifying failed API calls (or alternatively all API calls) for accessing operating system APIs such that they become compatible. For example, a proxy container may be added to a compatibility layer in a modified operating system kernel configured to forward API calls for accessing APIs. Upon receiving notification of the denial of an API call from the compatibility layer, the proxy container may be utilized to correct any deficiencies associated with the API call such that it is successfully executed. For example, the proxy container may include a number of parameters/flags associated with access rights for multiple operating system versions in an API's documentation which may be utilized to correct any deficiencies associated with a failed API call, thereby ensuring and/or increasing the likelihood of a successful API call being made to the operating system.

Container module 108 may create proxy container 124 in a variety of ways. In some examples, container module 108 may dynamically create proxy container 124 by accessing a compatibility layer that receives API call 116 in a kernel for operating system 118 and create proxy container 124 within the compatibility layer. In some examples, container module 108 may only be created in the compatibility layer upon the failure of API call 116 (e.g., only upon the determination of API incompatibility 204).

At step 308, one or more of the systems described herein may modify, utilizing the proxy container created at step 306, the API call to be compatible with the computing operating system. For example, proxy module 110 may, as part of computing device 202 in FIG. 2, modify API call 116 to be compatible with operating system 118.

Proxy module 110 may modify API call 116 in a variety of ways. In some examples, proxy module 110 may adjust one or more parameters associated with API call 116 such that API call 116 becomes compatible with operating system 118. For example, proxy module 110 may adjust a parameter associated with calling an API for creating a remote thread for performing a conde injection operation associated with disseminating malware.

At step 310, one or more of the systems described herein may send the API call modified at step 308 to the computing operating system for retrieving an API that may be utilized by malware. For example, sending module 112 may, as part of computing device 202 in FIG. 2, send modified API call 126 from proxy container 124 to operating system 118 for retrieving an API (e.g., API 122) utilized by malware.

Sending module 112 may send modified API call 126 in a variety of ways. For example, sending module 112 may instruct proxy container 124 to send modified API call 126 to retrieve API 122 via a kernel for operating system 118 for execution. Additional details regarding the function of proxy container 124 in sending modified API call 126 will be provided in the description of FIG. 5, below.

At step 312, one or more of the systems described herein may perform a security action during a malware threat analysis by executing the API retrieved at step 314 to disseminate malicious code in a sandboxed environment. For example, security module 114 may, as part of computing device 202 in FIG. 2, perform a security action during malware threat analysis 206 by disseminating malicious code 130 from a malware process in sandbox 128 following the execution of API 122 by operating system 118.

The term "sandbox," as used herein, generally refers to a virtual environment or emulated system created on a computing system for executing untested or untrusted programs or code, such as malware, without risking harm to a host computing device or operating system. For example, a sandbox may be implemented in a restricted operating system environment to allow for the execution and observation of malware on a number of computing operating systems.

Security module 114 may perform a security action during malware threat analysis 206 in a variety of ways. In some examples, security module 114 may analyze malicious code 130 in sandbox 128 to observe its behavior and utilize the observations to determine and/or enhance threat protection measures associated with protecting computing devices against infection when malware containing malicious code 130 is executed outside of sandbox 128.

Figure 4:
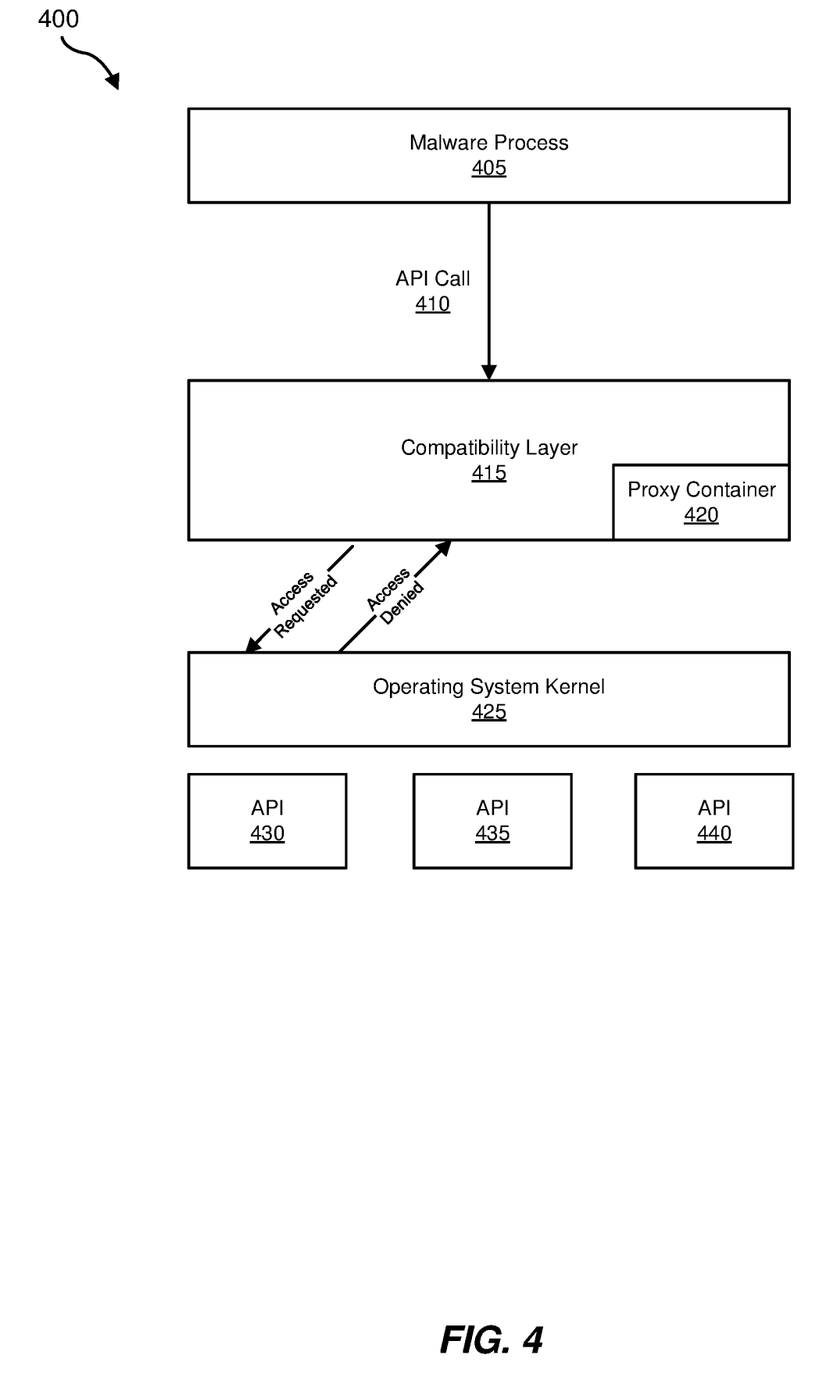
FIG. 4 is a block diagram of an example system for providing a proxy container to handle incompatible API operating system calls initiated by an unreliable malware process.

FIG. 4 is a block diagram of an example system 400 for providing a proxy container to handle incompatible API operating system calls initiated by an unreliable malware process. System 400 includes a malware process 405 that may be configured to send an API call 410, via compatibility layer 415, to operating system kernel 425 for retrieving one or more of API 430, API 435, and/or API 440.

Upon being received by compatibility layer 415, a request for access to operating system kernel 425 by API call 410 may be denied due to incompatibilities between API call 410 and access rights associated with API documentation for operating system kernel 425. Upon denial of access request, proxy container 420 may be dynamically created in compatibility layer 415 for providing any necessary access rights to API call 410 as discussed above with respect to step 306 of FIG. 3.

Figure 5:
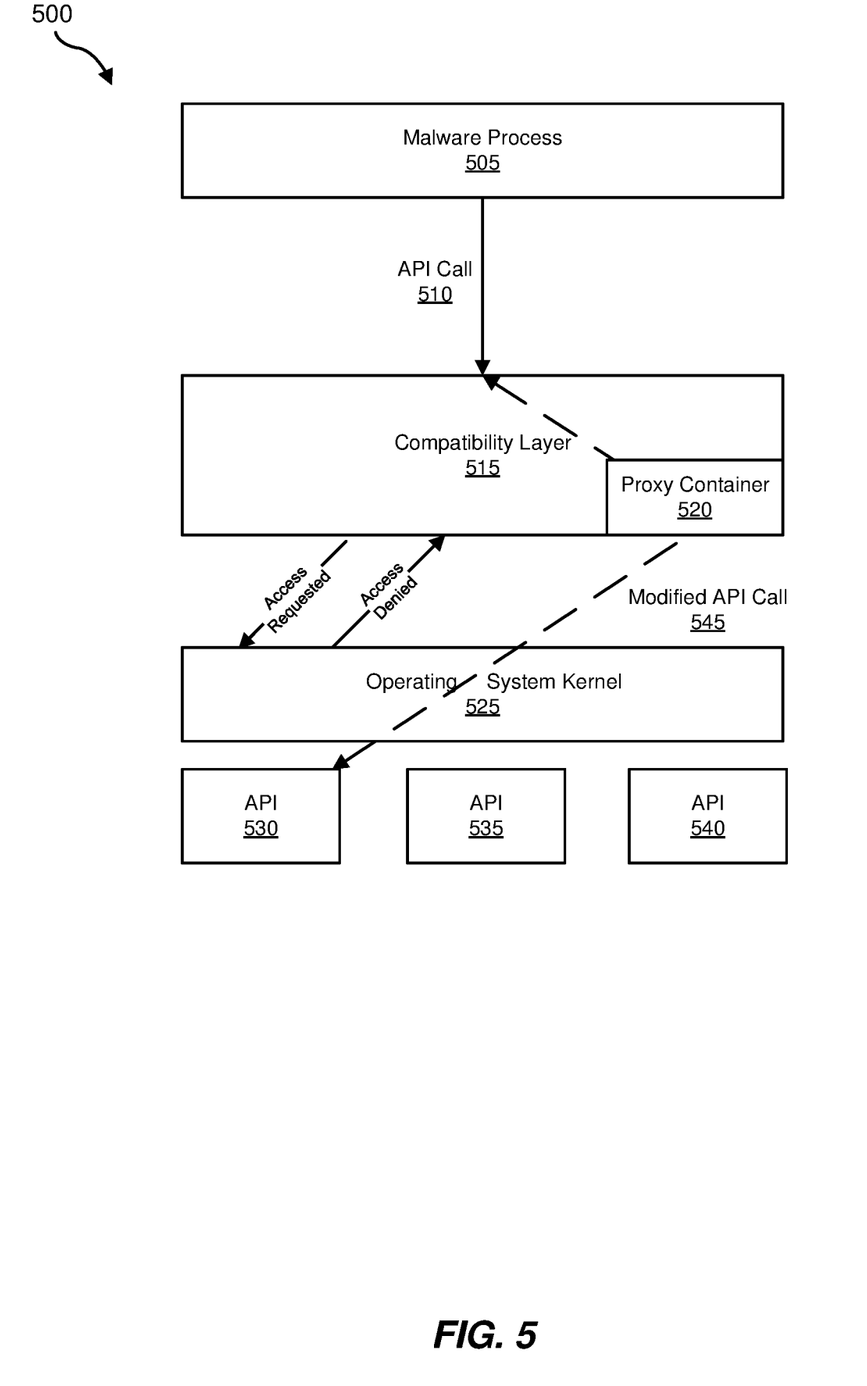
FIG. 5 is a block diagram of an additional example system for providing a proxy container to handle incompatible API operating system calls initiated by an unreliable malware process.

FIG. 5 is a block diagram of an example system 500 for providing a proxy container to handle incompatible API operating system calls initiated by an unreliable malware process. System 500 includes a malware process 505 that may be configured to send an API call 510, via compatibility layer 515, to operating system kernel 525 for retrieving one or more of API 530, API 535, and/or API 540.

Upon being received by compatibility layer 515, a request for access to operating system kernel 525 by API call 510 may be denied due to incompatibilities between API call 510 and access rights associated with API documentation for operating system kernel 525. Upon denial of access request, proxy container 520 may be dynamically created in compatibility layer 515 and receive API call 510 for providing any necessary access rights to API call 510 by modifying API call 510 into modified API call 545. Upon generating modified API call 545, proxy container 520 may send modified API call 545 for successful execution by operating system kernel 525 and thereby enable retrieval of API 530, as discussed above with respect to steps 308 and 310 of FIG. 3.

As explained in connection with method 300 above, the systems and methods described herein provide for safely executing unreliable malware. By intercepting a number of APIs that malware may utilize to carry out various techniques (e.g., code injection), the systems described herein may ensure that any provided parameters/flags adhere to the corresponding API documentation before the API is executed on a computing system. When a discrepancy is detected, the systems provided herein may "fix" any parameters/flags provided by malware to ensure or increase the likelihood of a successful execution of the API and, consequently, successful detonation of the malware. As one example, an API for creating a remote thread in a computing operating system (e.g., WINDOWS's API CreateRemoteThread) that is known to be utilized by malware to perform a code injection technique may have a parameter including a process handle with limited access rights (e.g., PROCESS_CREATE_THREAD, PROCESS_VM_WRITE, and PROCESS_VM_READ) that will successfully execute on 32-bit computing systems but fail to run on 64-bit systems. In this example, the systems described herein may assist the execution of the process handles on 64-bit systems by providing full access rights (as defined in the API documentation) to the malware such that all of the API access rights are requested in an API request to the operating system. Thus, for example, the systems described herein may hook APIs that will result in returning a process handle modify the parameter to include an appropriate process handle (e.g., NtOpenProcess) which provide full access rights (e.g., PROCESS_CREATE_THREAD, PROCESS_QUERY_INFORMATION, PROCESS_VM_OPERATION, PROCESS_VM_WRITE, and PROCESS_VM_READ) to the API such that it will successfully execute on 64-bit computing systems. As a result, a malware analysis system may observe the behavior of malware written for 32-bit computing systems in a testing environment (e.g., a sandbox).

Figure 6:
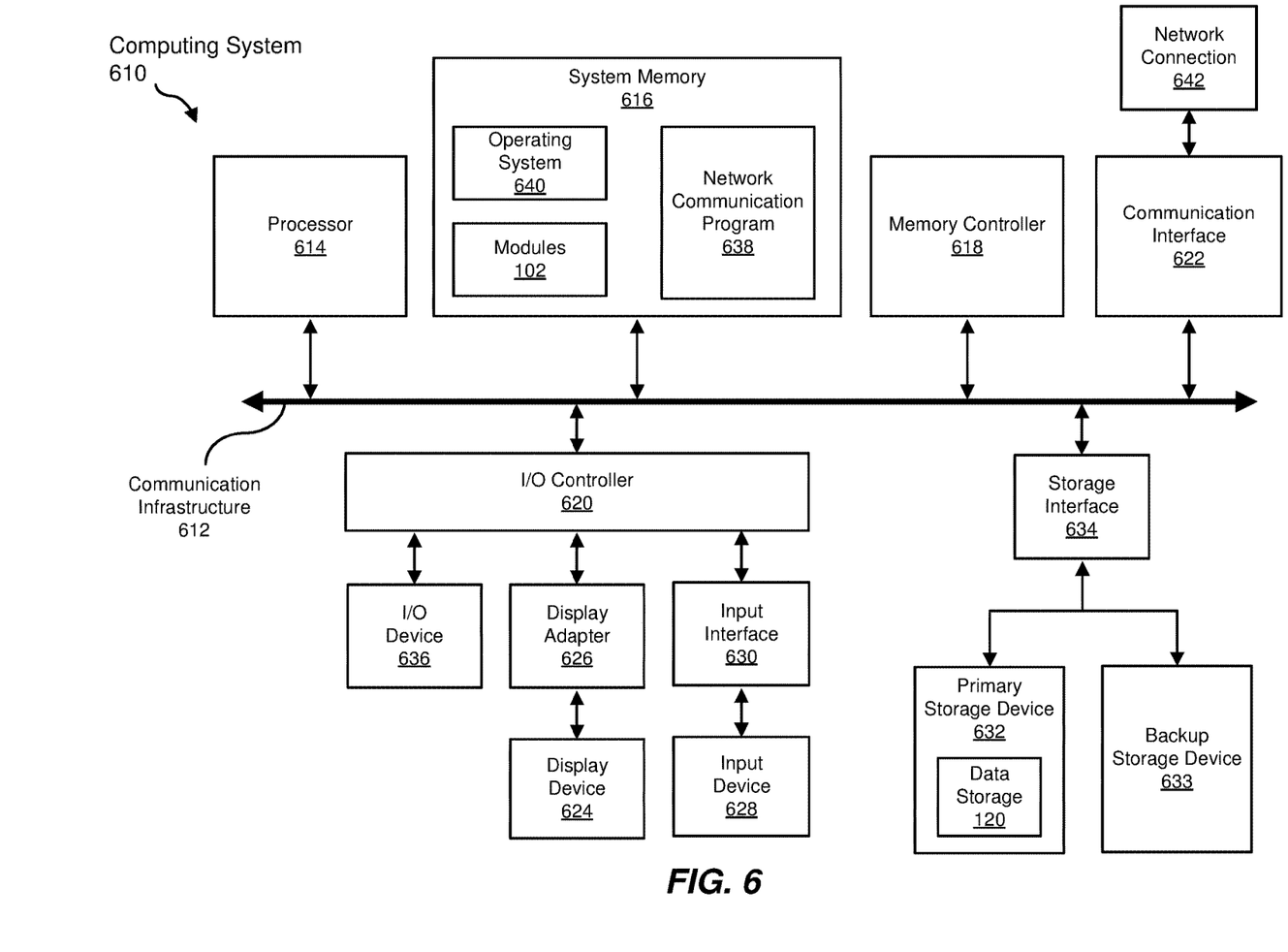
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
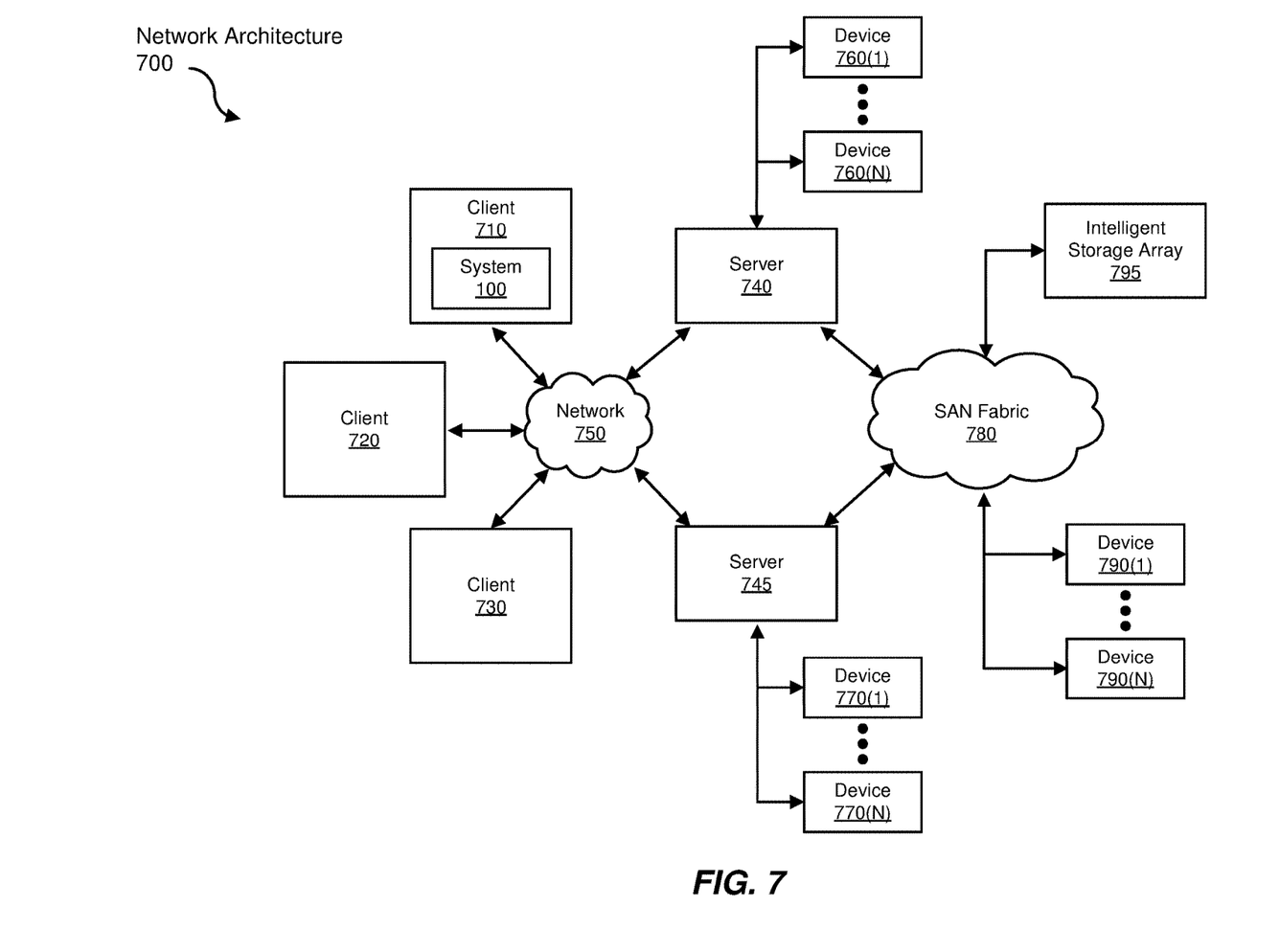
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for safely executing unreliable malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for safely executing unreliable malware, at least a portion of the method being performed by a computing device comprising at least one processor, the method comprising:
intercepting, by the one or more computing devices, a call to an application programming interface (API) in a computing operating system, wherein the API is utilized by malware for disseminating malicious code;
determining, by the one or more computing devices, an incompatibility between the API call and the computing operating system that prevents successful execution of the API call, wherein determining the incompatibility includes determining that the API call is incompatible with a version of the computing operating system with stricter access rights than a different version of the computing operating system;
creating, by the one or more computing devices, a proxy container for receiving the API call;
modifying, by the one or more computing devices and utilizing the proxy container, the API call to be compatible with the computing operating system;
sending, by the one or more computing devices, the modified API call from the proxy container to the computing operating system for retrieving the API utilized by the malware; and
performing, by the one or more computing devices, a security action during a threat analysis of the malware by executing the API to disseminate the malicious code in a sandboxed environment.

2. The computer-implemented method of claim 1, wherein intercepting the API call comprises receiving the API call in a compatibility layer for the computing operating system.

3. The computer-implemented method of claim 1, wherein the API call is compatible with the different version of the computing operating system.

4. The computer-implemented method of claim 1, wherein determining the incompatibility between the API call and the computing operating system that prevents successful execution of the API call comprises:
sending the API call in an access request to the computing operating system; and
receiving a denial of the access request based on the API call missing one or more access rights associated with the computing operating system.

5. The computer-implemented method of claim 1, wherein creating the proxy container to receive the API call comprises:
accessing a compatibility layer introduced to a kernel for the computing operating system to receive the API call; and
creating the proxy container within the compatibility layer.

6. The computer-implemented method of claim 1, wherein modifying the API call to be compatible with the computing operating system comprises adjusting one or more access rights associated with receiving the API call in the computing operating system.

7. The computer-implemented method of claim 1, wherein modifying the API call to be compatible with the computing operating system comprises adjusting one or more parameters associated with receiving the API call in the computing operating system.

8. The computer-implemented method of claim 7, wherein adjusting the one or parameters comprises adjusting a parameter associated with calling an API to create a remote thread for performing a code injection operation.

9. The computer-implemented method of claim 7, wherein adjusting the one or parameters comprises modifying the one or parameters to include a process handle which provides full access rights to the API.

10. The computer-implemented method of claim 1, wherein the threat analysis is associated with protecting the one or more computing devices against infection by the malware outside of the sandboxed environment.

11. A system for safely executing unreliable malware, the system comprising:
at least one physical processor;
physical memory comprising a plurality of modules and computer-executable instructions that, when executed by the physical processor, cause the physical processor to:
intercept, by an intercept module, a call to an application programming interface (API) in a computing operating system, wherein the API is utilized by malware for disseminating malicious code;
determine, by a determining module, an incompatibility between the API call and the computing operating system that prevents successful execution of the API call, wherein the determining module determines the incompatibility by determining that the API call is incompatible with a version of the computing operating system with stricter access rights than a different version of the computing operating system;
create, by a container module, a proxy container for receiving the API call;
modify, by a proxy module and utilizing the proxy container, the API call to be compatible with the computing operating system;
send, by a sending module, the modified API call from the proxy container to the computing operating system for retrieving the API utilized by the malware; and
perform, by a security module, a security action during a threat analysis of the malware by executing the API to disseminate the malicious code in a sandboxed environment.

12. The system of claim 11, wherein the intercepting module intercepts the API call by receiving the API call in a compatibility layer for the computing operating system.

13. The system of claim 11, wherein the API call is compatible with the different version of the computing operating system.

14. The system of claim 11, wherein the determining module determines the incompatibility between the API call and the computing operating system that prevents successful execution of the API call by:
sending the API call in an access request to the computing operating system; and
receiving a denial of the access request based on the API call missing one or more access rights associated with the computing operating system.

15. The system of claim 11, wherein the container module creates the proxy container to receive the API call by:
access a compatibility layer introduced to a kernel for the computing operating system to receive the API call; and
creating the proxy container within the compatibility layer.

16. The system of claim 11, wherein the proxy module modifies the API call to be compatible with the computing operating system by adjusting one or more access rights associated with receiving the API call in the computing operating system.

17. The system of claim 11, wherein the proxy module modifies the API call to be compatible with the computing operating system by adjusting one or more parameters associated with receiving the API call in the computing operating system.

18. The system of claim 17, wherein the proxy module adjusts the one or parameters by adjusting a parameter associated with calling an API to create a remote thread for performing a code injection operation.

19. The system of claim 17, wherein the proxy module adjusts the one or parameters by modifying the one or parameters to include a process handle which provides full access rights to the API.

20. A non-transitory computer-readable medium comprising one or more computer-executable instructions that, when executed by at least one processor of a computing device, cause the computing device to:

intercept a call to an application programming interface (API) in a computing operating system, wherein the API is utilized by malware for disseminating malicious code;

determine an incompatibility between the API call and the computing operating system that prevents successful execution of the API call, wherein determining the incompatibility includes determining that the API call is incompatible with a version of the computing operating system with stricter access rights than a different version of the computing operating system;

create a proxy container for receiving the API call;

modify, utilizing the proxy container, the API call to be compatible with the computing operating system;

send the modified API call from the proxy container to the computing operating system for retrieving the API utilized by the malware; and perform a security action during a threat analysis of the malware by executing the API to disseminate the malicious code in a sandboxed environment.

* * * * *